United States Patent
Mese et al.

(10) Patent No.: US 8,488,459 B2
(45) Date of Patent: Jul. 16, 2013

(54) POWER CONTROL AND QUALITY OF SERVICE (QOS) IMPLEMENTATION IN A COMMUNICATION SYSTEM

(75) Inventors: Murat Mese, Rancho Palos Verdes, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 11/349,611

(22) Filed: Feb. 7, 2006

(65) Prior Publication Data

US 2006/0215559 A1 Sep. 28, 2006

Related U.S. Application Data

(60) Provisional application No. 60/658,990, filed on Mar. 4, 2005, provisional application No. 60/707,208, filed on Aug. 10, 2005.

(51) Int. Cl.
*H04L 12/26* (2006.01)

(52) U.S. Cl.
USPC ...... 370/232; 370/329; 370/395.21; 455/522; 455/452.2

(58) Field of Classification Search
USPC ......... 455/500, 522, 69, 103, 127.1; 370/232, 370/395.21, 329
See application file for complete search history.

(56) References Cited

U.S. PATENT DOCUMENTS

| | | | |
|---|---|---|---|
| 5,406,613 A | | 4/1995 | Peponides et al. |
| 5,461,639 A | * | 10/1995 | Wheatley et al. ............ 370/342 |
| 5,623,484 A | * | 4/1997 | Muszynski .................. 370/335 |
| 5,745,480 A | * | 4/1998 | Behtash et al. ............... 370/252 |
| 6,038,220 A | | 3/2000 | Kang et al. |
| 6,144,841 A | | 11/2000 | Feeney |
| 6,154,659 A | | 11/2000 | Jalali et al. |
| 6,167,259 A | * | 12/2000 | Shah ............................. 455/424 |

(Continued)

FOREIGN PATENT DOCUMENTS

| | | |
|---|---|---|
| CN | 1523783 | 8/2004 |
| EP | 1450575 | 8/2004 |

(Continued)

OTHER PUBLICATIONS

Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.

(Continued)

*Primary Examiner* — Kibrom T Hailu
*Assistant Examiner* — Zewdu A Beyen

(57) ABSTRACT

For Quality of Service (QoS) implementation in a multiple-access communication system, a base station processes data transmissions from terminals for all QoS classes supported by the system and obtains status information for the data transmissions. The status information may indicate whether each packet is decoded correctly or in error and the delay for each packet. For each QoS class, the base station derives one or more metrics based on the status information for data transmissions from disadvantaged terminals and updates the QoS parameter based on the metrics and requirements for the QoS class. The QoS parameter for each QoS class determines the transmit powers for the data transmissions sent for that QoS class. The base station broadcasts the QoS parameters for all QoS classes. Each terminal uses the QoS parameter for an applicable QoS class for power control of the data transmission sent to the base station.

35 Claims, 6 Drawing Sheets

U.S. PATENT DOCUMENTS

| | | |
|---|---|---|
| 6,181,738 B1 | 1/2001 | Chheda et al. |
| 6,208,699 B1 | 3/2001 | Chen et al. |
| 6,374,117 B1* | 4/2002 | Denkert et al. ............... 455/522 |
| 6,519,705 B1 | 2/2003 | Leung |
| 6,597,705 B1 | 7/2003 | Rezaiifar et al. |
| 6,597,923 B1 | 7/2003 | Vanghi et al. |
| 6,603,746 B1 | 8/2003 | Larajani et al. |
| 6,606,311 B1* | 8/2003 | Wang et al. .................... 370/338 |
| 6,621,804 B1* | 9/2003 | Holtzman et al. ............. 370/329 |
| 6,628,956 B2 | 9/2003 | Bark et al. |
| 6,711,150 B1 | 3/2004 | Vanghi |
| 6,775,233 B1* | 8/2004 | Kumaran et al. .......... 370/230.1 |
| 6,781,973 B1* | 8/2004 | Lee ................................ 370/332 |
| 6,807,164 B1 | 10/2004 | Almgren et al. |
| 6,917,599 B2* | 7/2005 | Kono ............................. 370/320 |
| 6,950,669 B2 | 9/2005 | Simonsson |
| 6,952,591 B2 | 10/2005 | Budka et al. |
| 6,983,166 B2* | 1/2006 | Shiu et al. ..................... 455/522 |
| 7,031,718 B2* | 4/2006 | Jouppi et al. .................. 455/450 |
| 7,031,740 B2* | 4/2006 | Lundby et al. ................ 455/522 |
| 7,031,741 B2* | 4/2006 | Lee et al. ...................... 455/522 |
| 7,072,619 B2* | 7/2006 | Unno ............................... 455/69 |
| 7,184,426 B2* | 2/2007 | Padovani et al. ............. 370/347 |
| 7,209,724 B2* | 4/2007 | Richards et al. .............. 455/266 |
| 7,242,954 B2* | 7/2007 | Lehtinen et al. .............. 455/522 |
| 7,373,161 B2* | 5/2008 | Anderson ..................... 455/522 |
| 2002/0054578 A1* | 5/2002 | Zhang et al. .................. 370/328 |
| 2002/0077138 A1* | 6/2002 | Bark et al. .................... 455/522 |
| 2002/0085502 A1* | 7/2002 | Chheda et al. ................ 370/252 |
| 2002/0155853 A1* | 10/2002 | Lee et al. ...................... 455/522 |
| 2002/0183064 A1* | 12/2002 | Gopalakrishnan et al. ... 455/452 |
| 2003/0050086 A1* | 3/2003 | Lee et al. ...................... 455/522 |
| 2003/0064744 A1* | 4/2003 | Zhang et al. .................. 455/522 |
| 2003/0067897 A1* | 4/2003 | Black ............................ 370/335 |
| 2003/0128658 A1* | 7/2003 | Walton et al. ................. 370/208 |
| 2003/0144019 A1* | 7/2003 | Nelson et al. ................. 455/522 |
| 2003/0166407 A1* | 9/2003 | Qian et al. ..................... 455/522 |
| 2003/0198204 A1* | 10/2003 | Taneja et al. .................. 370/332 |
| 2004/0077370 A1 | 4/2004 | Dick et al. |
| 2004/0081248 A1* | 4/2004 | Parolari ......................... 375/259 |
| 2004/0132405 A1* | 7/2004 | Kitazawa et al. ............. 455/13.4 |
| 2004/0157618 A1 | 8/2004 | Brouwer |
| 2004/0166887 A1 | 8/2004 | Laroia et al. |
| 2004/0166899 A1 | 8/2004 | Nakayasu |
| 2004/0185786 A1* | 9/2004 | Mirbaha et al. ............. 455/67.11 |
| 2004/0228286 A1* | 11/2004 | Kim et al. ..................... 370/252 |
| 2004/0257985 A1* | 12/2004 | Sahai et al. ................... 370/229 |
| 2005/0002357 A1* | 1/2005 | Hu et al. ....................... 370/332 |
| 2005/0003846 A1* | 1/2005 | Anderson ..................... 455/522 |
| 2005/0032541 A1* | 2/2005 | Wang et al. ................... 455/522 |
| 2005/0041618 A1* | 2/2005 | Wei et al. ...................... 370/328 |
| 2005/0074238 A1* | 4/2005 | Sung et al. ...................... 398/58 |
| 2005/0099968 A1* | 5/2005 | Yamano ........................ 370/311 |
| 2005/0105589 A1* | 5/2005 | Sung et al. .................... 375/130 |
| 2005/0122898 A1* | 6/2005 | Jang et al. ..................... 370/218 |
| 2005/0163075 A1* | 7/2005 | Malladi et al. ................ 370/329 |
| 2005/0215276 A1* | 9/2005 | Koo et al. ..................... 455/522 |
| 2005/0239489 A1* | 10/2005 | Qian et al. ..................... 455/522 |
| 2005/0250468 A1* | 11/2005 | Lu et al. ........................ 455/403 |
| 2005/0282572 A1* | 12/2005 | Wigard et al. ................ 455/522 |
| 2005/0282574 A1* | 12/2005 | Li et al. ......................... 455/522 |
| 2006/0019694 A1* | 1/2006 | Sutivong et al. .............. 455/522 |
| 2006/0040674 A1* | 2/2006 | Vannithamby et al. .... 455/452.2 |
| 2006/0133368 A1* | 6/2006 | Tolliver ......................... 370/389 |
| 2006/0270443 A1* | 11/2006 | Lundby et al. ................ 455/522 |
| 2007/0021071 A1* | 1/2007 | Brouwer ......................... 455/69 |
| 2007/0111747 A1* | 5/2007 | Lundby et al. ................ 455/522 |
| 2007/0171867 A1* | 7/2007 | Kim .............................. 370/331 |
| 2007/0298825 A1* | 12/2007 | Kayama et al. ............... 455/522 |
| 2008/0014978 A1* | 1/2008 | Kaneko et al. ................ 455/522 |
| 2008/0014980 A1* | 1/2008 | Yano et al. .................... 455/522 |
| 2008/0056181 A1* | 3/2008 | Imamura et al. .............. 370/329 |
| 2008/0076359 A1* | 3/2008 | Charpentier et al. ........ 455/63.1 |
| 2008/0096576 A1* | 4/2008 | Brueck et al. ................. 455/453 |
| 2008/0130527 A1* | 6/2008 | Huh et al. ..................... 370/280 |
| 2008/0198814 A1* | 8/2008 | Wengerter et al. ............ 370/336 |
| 2008/0207251 A1* | 8/2008 | Anderson ..................... 455/522 |

FOREIGN PATENT DOCUMENTS

| | | |
|---|---|---|
| JP | 9307499 A | 11/1997 |
| JP | 2004128993 | 4/2004 |
| JP | 2004253932 | 9/2004 |
| WO | 0120808 | 3/2001 |
| WO | WO2005013533 | 2/2005 |

OTHER PUBLICATIONS

International Search Report and Written Opinion—PCT/US2006/008139, International Search Authority—European Patent Office—Jun. 26, 2006.

Taiwan Search Report—TW095107096—TIPO—Feb. 27, 2012.

* cited by examiner

POWER CONTROL AND QUALITY OF SERVICE (QOS) IMPLEMENTATION IN A COMMUNICATION SYSTEM

CLAIM OF PRIORITY UNDER 35 U.S.C. §119

The present Application for Patent claims priority to Provisional Application No. 60/658,990 entitled "QUALITY OF SERVICE IMPLEMENTATION OF POWER CONTROL FOR A WIRELESS COMMUNICATION SYSTEM UTILIZING ORTHOGONAL MULTIPLEXING" filed Mar. 4, 2005, and Provisional Application No. 60/707,208 entitled "POWER CONTROL AND QUALITY OF SERVICE (QOS) IMPLEMENTATION IN A COMMUNICATION SYSTEM" filed Aug. 10, 2005, and assigned to the assignee hereof and hereby expressly incorporated by reference herein.

BACKGROUND

I. Field

The present disclosure relates generally to communication and, more specifically to data transmission and power control in a communication system.

II. Background

A multiple-access communication system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the multiple transmissions on each link to be orthogonal to one another in time, frequency and/or code domain.

The multiple-access system may support various communication services such as voice, packet data, and so on. Each service may be associated with certain performance requirements. Terminals receiving different services may be distributed throughout the coverage area of the system and may observe different channel conditions. Consequently, these terminals need different amounts of transmit powers in order to achieve the performance specified for the services being received.

There is therefore a need in the art for techniques to ensure that terminals in a multiple-access system can achieve the performance specified for the services supported by the system.

SUMMARY

Techniques for controlling transmit power and supporting Quality of Service (QoS) implementation in a multiple-access communication system are described herein. QoS refers to a desired or a minimum level of performance for data transmission. QoS may be quantified by one or more criteria such as target packet error rate (PER), minimum data rate, maximum delay or latency, and so on. A QoS class is associated with specific QoS requirements, e.g., a specific target PER, a specific minimum data rate, a specific maximum delay, and so on. Multiple QoS classes with different QoS requirements may be defined for the systems. The services supported by the system may be mapped to the QoS classes.

A base station for a sector in the system receives data transmissions from terminals for all QoS classes supported by the system. The base station processes the data transmissions and obtains status information for these transmissions. The status information may indicate whether each received packet is decoded correctly (good) or in error (erased) and the delay experienced by each received packet. The base station selects one or more data transmissions to use for updating a QoS parameter for each QoS class. The selected data transmissions for each QoS class may be data transmissions from terminals located at the coverage edge. The QoS parameter for each QoS class may be a power control parameter that determines the transmit powers for data transmissions sent for the QoS class. For each QoS class, the base station determines one or more QoS metrics based on the status information for the selected data transmissions for the QoS class and updates the QoS parameter based on the one or more QoS metrics and one or more QoS requirements for the QoS class. The base station may broadcast the QoS parameters for all QoS classes to the terminals in the sector. Each terminal obtains the QoS parameter for the QoS class to which the terminal belongs and uses this QoS parameter for power control of a data transmission sent to the base station.

Various aspects and embodiments of the disclosure are described in further detail below.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The QoS and power control techniques described herein may be used for various multiple-access communication systems. For example, these techniques may be used for a code division multiple access (CDMA) system, a frequency division multiple access (FDMA) system, a time division multiple access (TDMA) system, an orthogonal frequency division multiple access (OFDMA) system, a spatial division multiple access (SDMA) system, a quasi-orthogonal multiple-access system, and so on. The techniques may also be used for transmissions on the forward and reverse links. For clarity, much of the following description is for reverse link transmissions.

Figure 1:
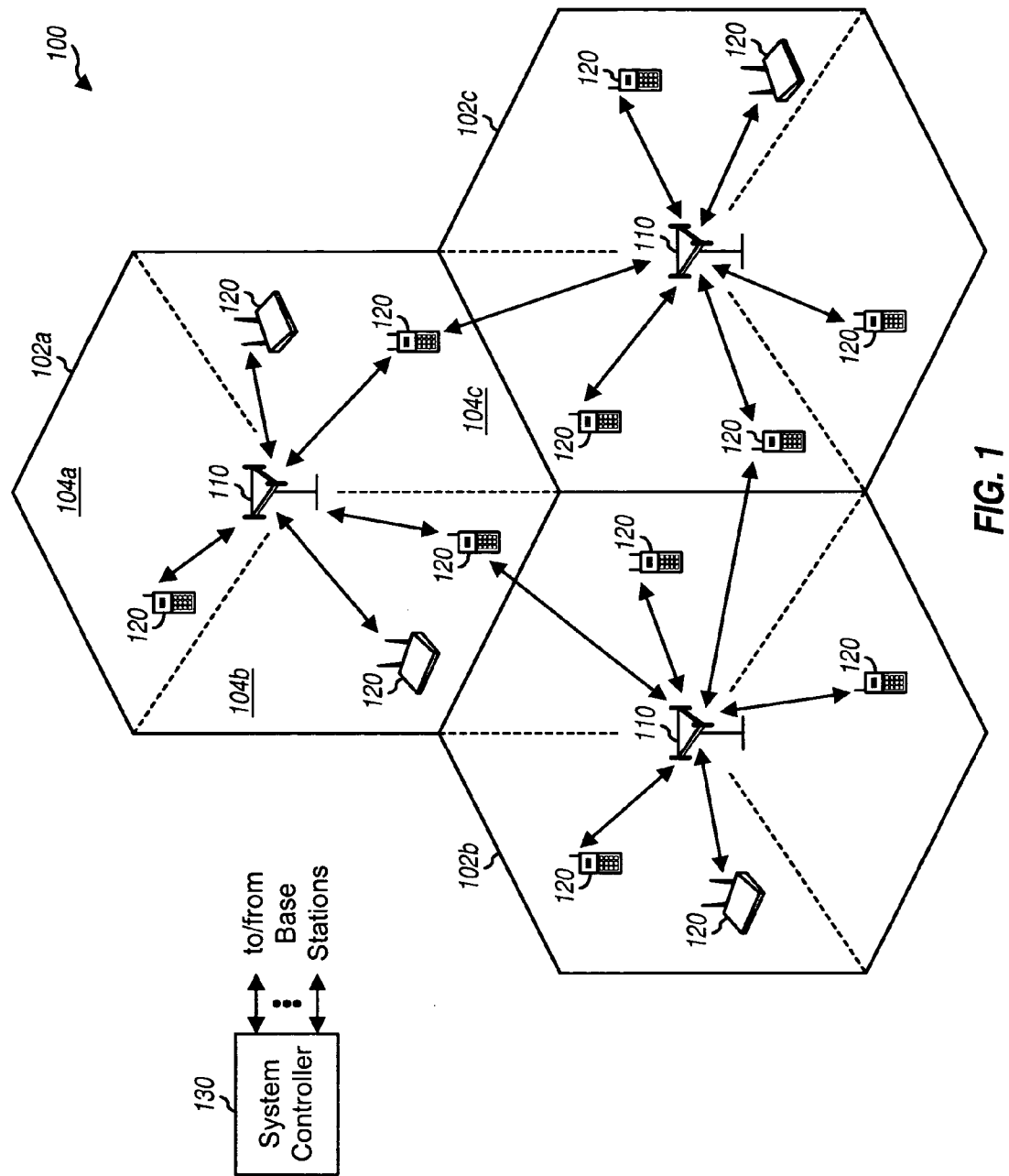
FIG. 1 shows a system with multiple base stations and multiple terminals.

FIG. 1 shows a multiple-access communication system 100 with multiple base stations 110 and multiple terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. For simplicity, the term "base station" is used generically herein for both a fixed station that serves a cell and a fixed station that serves a sector. A system controller 130 couples to base stations 110 and provides coordination and control for these base stations.

A terminal may be fixed or mobile and may also be called a mobile station, a wireless device, a user equipment, or some other terminology. Each terminal may communicate with zero, one, or multiple base stations at any given moment. In the following description, the terms "terminal" and "user" are used interchangeably, and the terms "sector" and "base station" are also used interchangeably. A serving base station is a base station/sector with which a terminal communicates.

System 100 may provide various communication services such as voice, packet data, video, media broadcast, text messaging, and so on. Each service and/or each tier of a service may be associated with specific performance requirements. For example, voice service may be associated with specific target PER, minimum data rate, and maximum delay requirements. As another example, packet data service may be associated with a specific target PER requirement, and different tiers of packet data service may be associated with different minimum data rate requirements. Packet data service may also be associated with requirements for packet latency, latency jitter, packet call latency (which may be appropriate for traffic such as HTTP where there are multiple objects per call), packet call latency jitter, erasure rate, misdetection, false alarm, outage probability, and so on, or any combination thereof.

Multiple (L) QoS classes may be defined for the system, where L>1. Each QoS class is associated with specific QoS requirements, and different QoS classes have different QoS requirements. The services supported by the system may be mapped to the QoS classes. In general, each service may be mapped to a different QoS class, different tiers of a service with different performance requirements may be mapped to different QoS classes, different services with the same performance requirements may be mapped to the same QoS class, and so on. For example, different tiers of voice or packet data service may have different minimum data rate requirements but the same target PER and maximum delay requirements, and each tier may be mapped to a different QoS class. The QoS requirements for each QoS class may be determined by the performance requirements of the service(s) mapped to that QoS class. For example, a QoS class for voice service may be associated with a specific error event rate, where an error event may be due to a packet that is decoded in error or a packet that is received after a specified maximum delay. The QoS requirement for this QoS class is then determined by the target PER and maximum delay requirements for voice service.

A terminal may receive one service at any given moment or multiple services (e.g., voice and packet data) concurrently. The terminals in the system may receive different services supported by the system. Each terminal would need to meet the QoS requirements of each QoS class for each service being received by the terminal.

As shown in FIG. 1, the terminals may be distributed throughout the coverage area of the system and may observe different channel conditions. Consequently, for a given data rate, the terminals typically require different amounts of transmit power to achieve a given received signal-to-noise-and-interference ratio (SNR) at the serving base stations. A disadvantaged terminal has a small channel gain (or a large path loss) for the serving base station and needs to transmit at a high power level in order to achieve the given received SNR at the serving base station. The disadvantaged terminal is typically located at the edge of coverage but may, in general, be located anywhere. A strong terminal has a large channel gain (or a small path loss) for the serving base station and can transmit at a lower power level for the same received SNR. Each terminal requires a certain amount of transmit power in order to meet the QoS requirements for each QoS class applicable to that terminal.

A power control mechanism may be used to adjust the transmit powers for the data transmissions sent for each QoS class such that the QoS requirements of the QoS class can be met. The power control mechanism may be implemented in various manners. For clarity, some exemplary designs are described below.

Figure 2:
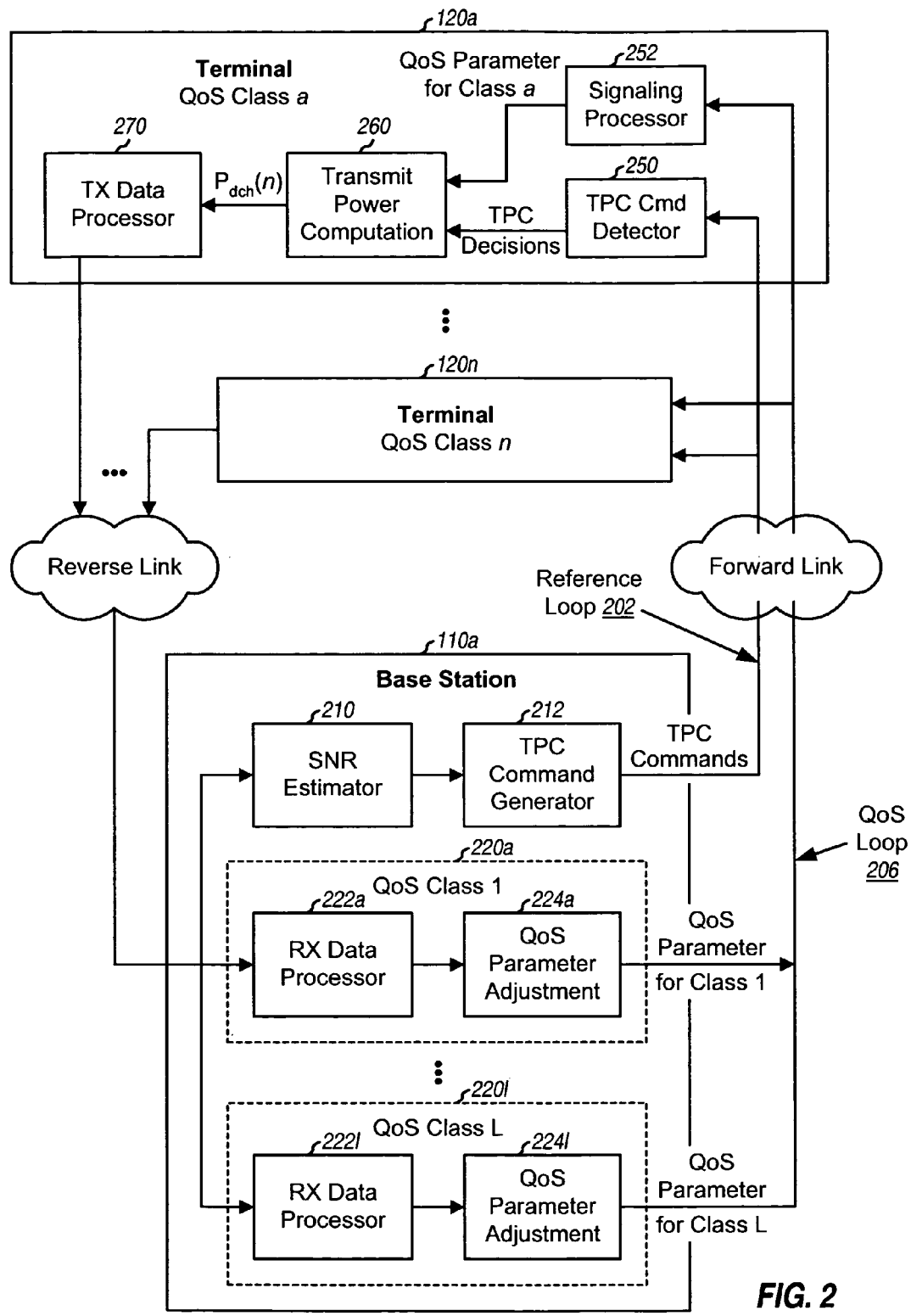
FIG. 2 shows a power control mechanism that supports multiple QoS classes.

FIG. 2 shows a power control mechanism 200 that supports QoS implementation. Base station 110a supports multiple (L) QoS classes that are given indices of 1 through L, where L>1. Base station 110a communicates with N terminals 120a through 120n, where N≧1. For simplicity, the following description assumes that one QoS class is applicable to each terminal, with QoS class a being applicable to terminal 120a, where a∈{1, ..., L}, and QoS class n being applicable to terminal 120n, where a∈{1, ..., L}. One traffic channel is assigned to each terminal, and the data transmission on the assigned traffic channel needs to meet the QoS requirements of the applicable QoS class.

For the embodiment shown in FIG. 2, power control mechanism 200 includes a reference loop 202 and a QoS loop 206. In an embodiment, reference loop 202 operates between base station 110a and each terminal 120, and QoS loop 206 operates between base station 110a and all terminals in the same QoS class.

The operation of reference loop 202 for terminal 120a is described below. Reference loop 202 adjusts the transmit power for a designated transmission from terminal 120a to maintain the received SNR for this transmission, as measured at base station 110a, as close as possible to a target SNR. The designated transmission may be signaling sent by terminal 120a on a control channel, packet data sent by terminal 120a on the assigned traffic channel, or some other transmission. The transmit power for the designated transmission is also called a reference power level. For reference loop 202, an SNR estimator 210 at base station 110a estimates the received SNR for the designated transmission. A transmit power control (TPC) command generator 212 compares the received SNR against the target SNR, which may be adjusted by another loop to achieve a desired level of performance (e.g., 1% PER) for the designated transmission. Generator 212 generates TPC commands based on the comparison results. Each TPC command may be (1) an UP command to direct terminal 120a to increase the reference power level if the received SNR is below the target SNR or (2) a DOWN command to direct terminal 120a to decrease the reference power level if the received SNR is equal to or higher than the target SNR. Base station 110a transmits the TPC commands on the forward link to terminal 120a.

Terminal 120a receives and processes the forward link transmission from base station 110a. Within terminal 120a, a TPC command (Cmd) detector 250 detects each TPC command sent for terminal 120a and provides a TPC decision, which may be either (1) an UP decision if the received TPC command is deemed to be an UP command or (2) a DOWN decision if the received TPC command is deemed to be a DOWN command. A transmit power computation unit 260 adjusts the reference power level based on the TPC decisions from TPC command detector 250. A transmit (TX) data processor 270 scales the designated transmission to achieve the reference power level. Terminal 120a sends the designated transmission to base station 110a.

Due to path loss, fading, and multipath effects on the reverse link, which typically vary over time and especially for a mobile terminal, the received SNR for the designated transmission continually fluctuates. Reference loop 202 attempts to maintain the received SNR for the designated transmission at or near the target SNR in the presence of changes in the reverse link channel conditions.

QoS loop 206 maintains the QoS parameter for each QoS class supported by the system. The QoS parameter for each QoS class is used to (1) adjust the transmit power for each data transmission sent to base station 110a for that QoS class and (2) ensure that all terminals belonging in the QoS class can meet the QoS requirements of the QoS class. The terminals in each QoS class may be distributed throughout the coverage area of base station 110a. The data transmissions from the disadvantaged terminals typically require higher transmit powers in order to meet the QoS requirements. In an embodiment, the QoS parameter for each QoS class is adjusted based on the data transmissions from the disadvantaged terminals in the QoS class. All terminals in each QoS class can be assured of meeting the QoS requirements for the QoS class by ensuring that even the disadvantaged terminals can meet these QoS requirements.

For QoS loop 206, L units 220a through 220l, which may be comprised in a single processor or multiple processors, at base station 110a independently adjust the QoS parameters for the L QoS classes. Within unit 220 for each QoS class, a receive (RX) data processor 222 processes the data transmissions sent by the terminals for that QoS class, determines whether each packet is decoded correctly or in error, and provides status information (e.g., the status and delay of each packet) to a QoS parameter adjustment unit 224. Unit 224 determines one or more QoS metrics based on the status information for the data transmissions from the disadvantaged terminals. Unit 224 then adjusts the QoS parameter such that the QoS metrics conform to the QoS requirements. L units 224a through 224l provide the QoS parameters for the L QoS classes, which are broadcast on the forward link to the terminals.

At terminal 120a, a signaling processor 252 processes the forward link transmission from base station 110a and obtains the QoS parameter for QoS class a, which is applicable to terminal 120a. Transmit power computation unit 260 receives the QoS parameter from processor 252 and the TPC decisions from detector 250 and computes the transmit power for the assigned traffic channel based on all of the inputs. TX data processor 270 scales the data transmission based on the computed transmit power and sends the data transmission on the traffic channel to base station 110a.

The QoS parameter for each QoS class may be given in various forms. A suitable choice for the QoS parameter may be dependent on various factors such as the system type, the desired performance characteristics, and so on. As an example, for a TDMA, FDMA, or OFDMA system, the QoS parameter may place a lower bound on the received SNR for the traffic channel so that the required performance or better can be achieved. For a CDMA system or some other interference limited system, the QoS parameter may maintain the received SNR for the traffic channel at or near an SNR that can provide the required performance. For clarity, the following description is for one QoS class.

In one embodiment, the QoS parameter is a minimum transmit power delta $\Delta P_{min}$ that places a lower limit on the transmit power for a data transmission. For example, the transmit power for a traffic channel may be expressed as:

$$P_{dch}(n) = P_{ref}(n) + \Delta P(n),  \quad \text{Eq (1)}$$

where $P_{dch}(n)$ is the transmit power for the traffic channel for update interval n;

$P_{ref}(n)$ is a reference power level for update interval n; and $\Delta P(n)$ is a transmit power delta for update interval n.

The transmit power levels $P_{dch}(n)$ and $P_{ref}(n)$ and the transmit power delta $\Delta P(n)$ are given in units of decibels (dB). $\Delta P(n)$ may be determined as described below. If the data transmission on the traffic channel and the designated transmission observe similar noise and interference characteristics, then equation (1) results in the received SNR for the data transmission being $\Delta P(n)$ dB higher than the received SNR for the designated transmission.

The transmit power delta may be constrained as follows:

$$\Delta P(n) \epsilon [\Delta P_{min}, \Delta P_{max}]  \quad \text{Eq (2)}$$

where $\Delta P_{min}$ is the minimum transmit power delta allowable for the traffic channel, and $\Delta P_{max}$ is the maximum transmit power delta allowable for the traffic channel.

The QoS loop adjusts $\Delta P_{min}$ to ensure that the terminals can meet the requirements for the QoS class. $\Delta P_{min}$ applies mostly to disadvantaged terminals observing poor channel conditions. A disadvantaged terminal is typically located closer to a neighbor sector, and a high transmit power level results in high inter-sector interference to this neighbor sector. A smaller $\Delta P_{min}$ allows the disadvantaged terminal to transmit at a lower power level, which then reduces inter-cell interference. However, $\Delta P_{min}$ should not be set too low in order to ensure that the disadvantaged terminal can meet the requirements for the QoS class.

In another embodiment, the QoS parameter is a transmit power offset $P_{os}$ that is added to the reference power level to obtain the transmit power for the traffic channel. For this embodiment, $P_{dch}(n)$ may be expressed as:

$$P_{dch}(n) = P_{ref}(n) + P_{os}  \quad \text{Eq (3)}$$

where $P_{os}$ is a transmit power offset that is given in units of dB. The QoS loop maintains the received SNR for the data transmission on the traffic channel approximately $P_{os}$ dB higher than the received SNR for the designated transmission.

In yet another embodiment, the QoS parameter is the target SNR used to adjust the reference power level $P_{ref}(n)$. For this embodiment, the designated transmission may be the data transmission on the traffic channel. The received SNR of the data transmission is adjusted to achieve the target SNR, which in turn is adjusted to meet QoS requirements.

The minimum transmit power delta $\Delta P_{min}$, the transmit power offset $P_{os}$, and the target SNR are three exemplary forms of the QoS parameter. The QoS parameter may also be given in other forms and may be used to adjust any transmission parameter, and this is within the scope of the disclosure. For example, a target average number of transmissions per packet (HARQ) may be adjusted instead of a target SNR. Transmit power may then be adjusted based on early/late packet termination compared to the target average number of transmissions.

The disadvantaged terminals in each QoS class may be identified in various manners. A channel gain for each terminal may be estimated based on a pilot or some other transmission sent by the terminal. A pilot is a transmission of symbols that are known a priori by both a transmitter and a receiver. In an embodiment, the estimated channel gain for each terminal is compared against a gain threshold, and the terminal is deemed to be a disadvantaged terminal if its channel gain is below the gain threshold. In another embodiment, the estimated channel gains for all terminals in each QoS class are ordered, and a predetermined percentage (e.g., 10%) or a predetermined number of the terminals with the worst channel gains is deemed to be the disadvantaged terminals. In yet another embodiment, the terminals transmit their strongest channel gain ratios, and this information is used to identify disadvantaged terminals. In yet another embodiment, the disadvantaged terminals are identified based on the size of their active sets. An active set for a terminal contains base stations with which the terminal is in communication, and a larger active set size may be indicative of a disadvantaged terminal. In yet another embodiment, the disadvantaged terminals are identified based on SNRs for port sets. Each port set may cover a group of frequency subbands. Different port sets may have different restrictions on use, which may be determined based on a frequency reuse scheme. Different port sets may also have different QoS requirements, which may be fulfilled by maintaining a separate QoS parameter for each port set and adjusting the QoS parameter for each port set based on transmissions received on that port set. The disadvantaged terminals may also be identified based on pilot strength, carrier-to-noise ratio (C/N), or some other quality metric.

The QoS parameter for each QoS class may be updated based on the data transmissions from the disadvantaged terminals in the QoS class, as described above. The number of disadvantaged terminals used to update the QoS parameter may be selected to provide good statistical averaging of error events used to update the QoS parameter. Alternatively, the QoS parameter for each QoS class may be updated based on data transmissions from all terminals in the QoS class. For clarity, much of the description below assumes that the QoS parameter for each QoS class is updated based on the data transmissions from the disadvantaged terminals.

Figure 3:
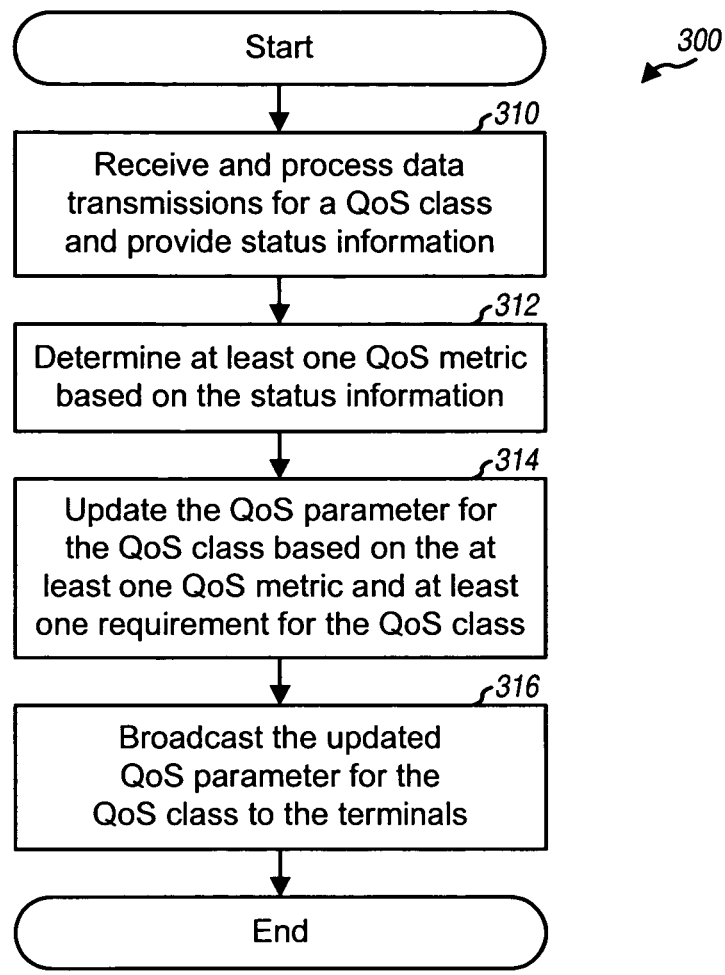
FIG. 3 shows a process for updating the QoS parameter for a QoS class.

FIG. 3 shows a process 300 for updating the QoS parameter for a QoS class. Data transmissions from all terminals in the QoS class are received and processed (e.g., demodulated and decoded) to obtain status information for the data transmissions (block 310). The status information may include, for example, the status of each received packet (good or erased), the delay of each packet, and so on. At least one QoS metric is determined based on the status information for the data transmissions from the disadvantaged terminals (block 312). Various QoS metrics may be used such as event error rate, PER, transmission delay, and so on. QoS metrics may be defined based on any requirements for the QoS class (e.g., the requirements for packet data described above). The QoS parameter is updated based on the at least one QoS metric and at least one QoS requirement for the QoS class (block 314). For example, the minimum transmit power delta $\Delta P_{min}$, the transmit power offset $P_{os}$, or the target SNR may be decreased if all QoS requirements are met and may be increased if any QoS requirement is not met. The updated QoS parameter for the QoS class may be broadcast to the terminals (block 316).

The QoS parameter may be updated in various manners depending on the form of the QoS parameter and the QoS metrics used for updating. A specific embodiment for updating the QoS parameter is described below. For this embodiment, the transmit power for each traffic channel is computed as shown in equations (1) and (2), the QoS parameter for each QoS class i is $\Delta P_{min,i}$, and the QoS metric is an error event rate ER(i). An error event can occur due to a packet being decoded in error, a packet not meeting the maximum delay requirement, and so on. Each QoS class i is associated with a specific upper limit on the rate of error events, which is denoted as ER_limit(i). For example, the QoS class for voice service may be associated with an upper limit of 1% error event rate.

Figure 4:
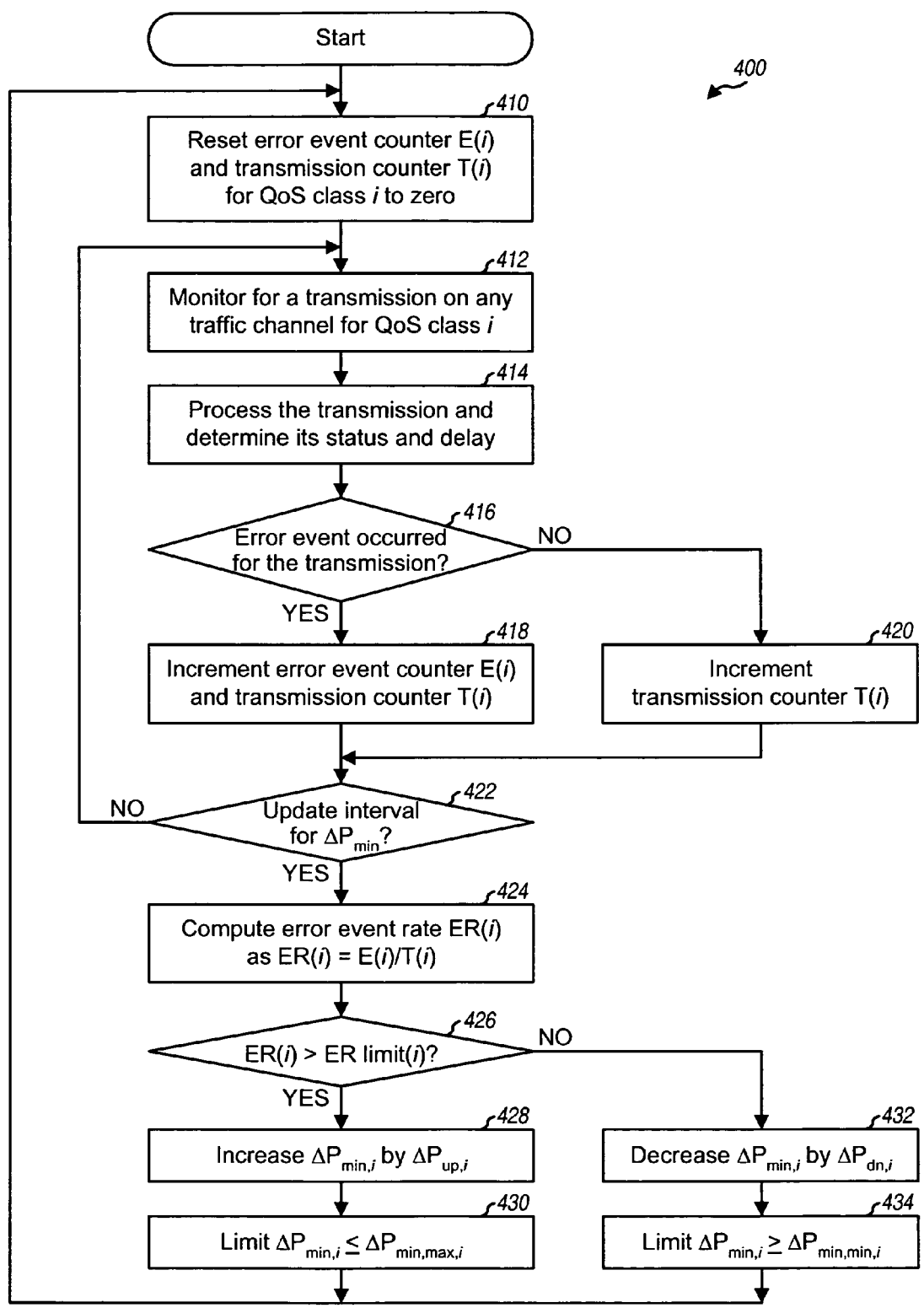
FIG. 4 shows a process for updating the QoS parameter for a QoS class based on error event rate.

FIG. 4 shows a process 400 for updating the QoS parameter for QoS class i for the specific embodiment described above. Initially, an error event counter E(i) and a transmission counter T(i) for QoS class i are both reset to zero, or E(i)=0 and T(i)=0 (block 410). The traffic channels for QoS class i are monitored for a packet transmission on any traffic channel (block 412). Whenever a packet transmission is received, the transmission is processed and the status of the received packet (e.g., good or erased) and the delay of the packet are determined (block 414).

A determination is then made whether (1) the packet transmission is from a disadvantaged terminal and (2) an error event has occurred for the packet transmission (block 416). If the answer is 'Yes' for block 416, then the error event counter is incremented as E(i)=E(i)+1 and the transmission counter is also incremented as T(i)=T(i)+1 (block 418). Otherwise, if the answer is 'No' for block 416, then only the transmission counter is incremented (block 420).

After blocks 418 and 420, a determination is made whether it is time to update the QoS parameter (block 422). The QoS parameter may be updated after receiving a predetermined number of transmissions, after encountering a predetermined number of error events, at designated time intervals, and so on. If the time for updating the QoS parameter has not arrived and the answer is 'No' for block 422, then the process returns to block 412 to wait for the next packet transmission for QoS class i.

If the answer is 'Yes' for block 422 and the QoS parameter is to be updated, then the error event rate is computed as ER(i)=E(i)/T(i) (block 424). If the QoS parameter is updated after every predetermined number of received packet transmissions, then the error event counter E(i) represents an unnormalized error event rate and may be used directly, so that ER(i) does not need to be computed. A determination is then made whether the error event rate ER(i) exceeds the ER_limit(i) for QoS class i (block 426). If the answer is 'Yes', then the QoS parameter $\Delta P_{min,i}$ for QoS class i is increased by $\Delta P_{up,i}$ or $\Delta P_{min,i} = \Delta P_{min,i} + \Delta P_{up,i}$ (block 428). The higher $\Delta P_{min,i}$ forces the disadvantaged terminals to use higher transmit powers, which can reduce error events for QoS class i. Otherwise, if the error event rate ER(i) is equal to or less than ER_limit(i), then the QoS parameter $\Delta P_{min,i}$ for QoS class i is decreased by $\Delta P_{dn,i}$ (block 432). The lower $\Delta P_{min,i}$ allows the disadvantaged terminals to use lower transmit powers, which may reduce interference to neighbor sectors. Blocks 428 and 432 may be expressed as:

$$\Delta P_{min,i} = \begin{cases} \Delta P_{min,i} + \Delta P_{up,i}, & \text{if } ER(i) > \text{ER\_limit}(i), \text{ and} \\ \Delta P_{min,i} - \Delta P_{dn,i}, & \text{if } ER(i) \leq \text{ER\_limit}(i). \end{cases} \quad \text{Eq (4)}$$

A range of allowable values for $\Delta P_{min,i}$ may be determined a priori for QoS class i, e.g., based on computer simulation, empirical measurements, and so on. $\Delta P_{min,i}$ may then be constrained to be within this range, or $\Delta P_{min,i} \in [\Delta P_{min,min,i}, \Delta P_{min,max,i}]$ where $\Delta P_{min,min,i}$ is the minimum value allowed for $\Delta P_{min,i}$ and $\Delta P_{min,max,i}$ is the maximum value allowed for $\Delta P_{min,i}$. After increasing $\Delta P_{min,i}$ in block 428, the updated $\Delta P_{min,i}$ is constrained to be less than or equal to $\Delta P_{min,max,i}$ (block 430). Similarly, after decreasing $\Delta P_{min,i}$ in block 432, the updated $\Delta P_{min,\ i}$ is constrained to be equal to or greater than $\Delta P_{min,\ max,\ i}$ (block 434). Blocks 430 and 434 may be expressed as:

$$\Delta P_{min,i} = \begin{cases} \Delta P_{min,max,i} & \text{if } \Delta P_{min,i} > \Delta P_{min,max,i}, \\ \Delta P_{min,i} & \text{if } \Delta P_{min,max,i} \geq \Delta P_{min,i} \geq \Delta P_{min,min,i}, \text{ and} \\ \Delta P_{min,min,i} & \text{if } \Delta P_{min,i} < \Delta P_{min,min,i}. \end{cases} \quad \text{Eq (5)}$$

After blocks 430 and 434, the process returns to block 410 for the next update interval for the QoS parameter.

In general, each QoS requirement for a QoS class may be explicitly or implicitly considered in updating the QoS parameter. For example, PER and maximum delay requirements for a QoS class may be explicitly considered in the computation of the error event rate. Minimum data rate requirement may be implicitly considered in categorizing the received data transmissions into the proper QoS classes.

FIGS. 3 and 4 show the updating of the QoS parameter for one QoS class. The same process may be performed independently for each of the L QoS classes supported by the system. The same or different QoS metrics may be used for the L QoS classes. The QoS parameters for the L QoS classes may be updated at the same or different update intervals. The update interval for each QoS class may be determined based on various factors such as the data rate and ER_limit(i) for that QoS class.

FIGS. 3 and 4 also show specific embodiments for updating the QoS parameter. In general, the QoS parameter may be updated in various manners and using various metrics. The QoS parameter may be maintained for each QoS class and may be updated based on the error event rate for the data transmissions from the disadvantaged terminals in that QoS class, as described above for FIG. 4. The QoS parameter may also be maintained for all terminals in each QoS class. The QoS parameter may also be maintained for each individual terminal and may be updated based on one or more QoS metrics derived for the data transmission from the terminal.

A power control mechanism supporting multiple QoS classes for an exemplary quasi-orthogonal multiple-access system, which is also called a quasi-orthogonal division access (QODA) system, is described below. The QODA system utilizes orthogonal frequency division multiplexing (OFDM), which is a multi-carrier modulation technique that partitions the overall system bandwidth into multiple (K) orthogonal frequency subbands. These subbands are also called tones, subcarriers, bins, frequency channels, and so on. Each subband is associated with a respective subcarrier that may be modulated with data The QODA system has multiple (M) sets of traffic channels, with each set containing multiple (N) traffic channels. Each traffic channel is mapped to a specific sequence of time-frequency blocks. Each time-frequency block corresponds to a specific subband set in a specific time slot. A subband set may include one or multiple subbands, and a time slot may span one or multiple symbol periods. Each traffic channel may be associated with a frequency hopping (FH) pattern that indicates a specific time-frequency block to use for the traffic channel in each time slot usable for data transmission.

The N traffic channels in each set are orthogonal to one another and no two traffic channels in the set use the same time-frequency block. The M channel sets overlap one another, and M traffic channels in the M sets map to each time-frequency block. For random overlapping, the mapping for a traffic channel in a channel set is pseudo-random with respect to the mappings for the traffic channels in each of the other M−1 channel sets. Random overlapping can provide intra-sector interference diversity. For common overlapping, the mapping for a traffic channel in a channel set is the same as the mapping for one traffic channel in each of the other M−1 channel sets. For common overlapping, M traffic channels map to and exclusively reuse the same sequence of time-frequency blocks. In any case, a total of M·N traffic channels are available for use in the QODA system. These traffic channels may be assigned for data transmissions for the L supported QoS classes.

With quasi-orthogonal multiplexing, multiple terminals can use the same time-frequency block. The total interference observed at each sector is composed of (1) intra-sector interference from terminals within the same sector and (2) inter-sector interference from terminals in other sectors. The intra-sector interference can come from (1) overlapping transmissions sent on the same time-frequency block and (2) loss of orthogonality among transmissions sent on orthogonal traffic channels. The loss of orthogonality may result in inter-carrier interference (ICI) and inter-symbol interference (ISI). The intra-sector interference and inter-sector interference have a large impact on performance and may be mitigated as described below.

Figure 5:
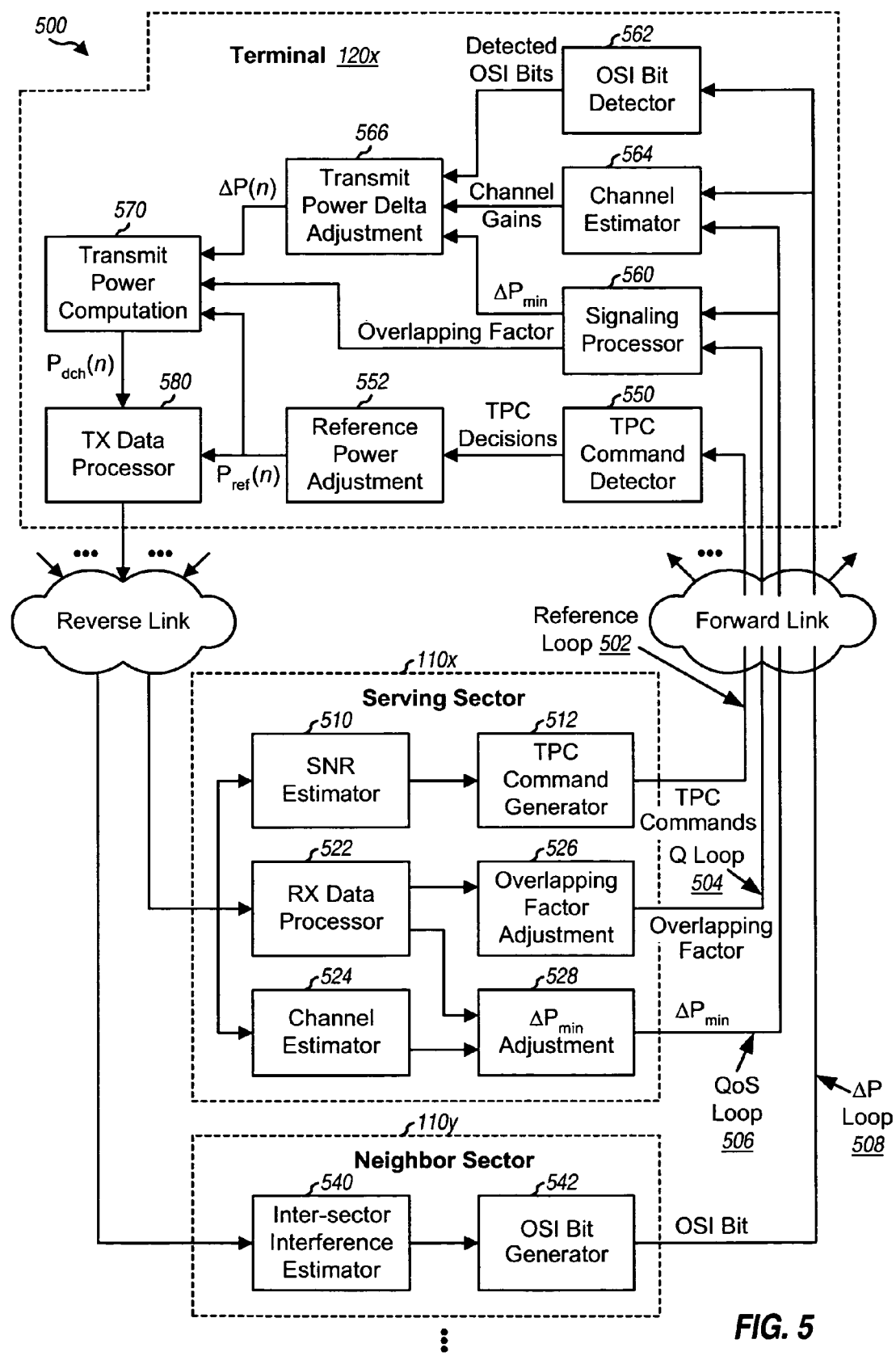
FIG. 5 shows a power control mechanism with four loops.

FIG. 5 shows a power control mechanism 500 that may be used to adjust the transmit power of a terminal 120x in the QODA system. Terminal 120x communicates with a serving sector 110x and may cause interference to neighbor sectors. FIG. 5 shows only one neighbor sector 110y for simplicity.

Power control mechanism 500 includes four loops—a reference loop 502, a Q loop 504, a QoS loop 506, and a ΔP loop 508. Reference loop 502 estimates the received SNR of terminal 120x at serving sector 110x and adjusts the reference power level $P_{ref}(n)$ such that the received SNR is maintained at or near the target SNR. ΔP loop 508 adjusts the transmit power for terminal 120x based on inter-sector interference consideration. QoS loop 506 adjusts $\Delta P_{min}$ and ensures that terminal 120x can achieve the QoS requirements for the applicable QoS class. Q loop 504 adjusts an overlapping factor to achieve good performance for sector 110x.

Reference loop 502, Q loop 504, and QoS loop 506 operate between terminal 120x and serving sector 110x. ΔP loop 508 operates between terminal 120x and neighbor sector 110y. Reference loop 502, Q loop 504, QoS loop 506, and ΔP loop 508 may be updated at different rates to ensure stability. For example, Q loop 504 may be updated at a slower rate than QoS loop 506, which may be updated at a slower rate than ΔP loop 508, which may be updated at a slower rate than reference loop 502.

Reference loop 502 may operate in the manner described above for reference loop 202 in FIG. 2. Base station 110x generates TPC commands for terminal 120x based on the received SNR of the designated transmission from terminal 110x and the target SNR. Terminal 120x receives the TPC commands and may adjust the reference power level based on each received TPC command, as follows:

$$P_{ref}(n) = \begin{cases} P_{ref}(n-1) + P_{up}, & \text{if } TPC = \text{UP, and} \\ P_{ref}(n-1) - P_{dn}, & \text{if } TPC = \text{DOWN,} \end{cases} \quad \text{Eq (6)}$$

where $P_{up}$ is an up step size for the reference power level and $P_{dn}$ is a down step size for the reference power level.

ΔP loop 508 adjusts the transmit power for the traffic channel such that a power level that is as high as possible is used for the traffic channel while keeping inter-sector interference to within acceptable levels. For ΔP loop 508, an inter-sector interference estimator 540 within neighbor sector 110y receives transmissions on the reverse link and estimates the inter-sector interference observed by sector 110y from terminals in other sectors. An other-sector interference (OSI) bit generator 542 receives the inter-sector interference estimate and sets an OSI bit for neighbor sector 110y, as $$OSIB(m) = \begin{cases} \text{'1'}, & \text{if } I_{inter}(m) \geq I_{target}, \text{ and} \\ \text{'0'}, & \text{if } I_{inter}(m) < I_{target}, \end{cases} \quad \text{Eq (7)}$$

where $I_{inter}(m)$ is an inter-sector interference estimate for sector 110y in time interval m;

$I_{target}$ is a nominal inter-sector interference threshold; and

OSIB(m) is the OSI bit for sector 110y in time interval m. Neighbor sector 110y may also generate some other indication of the inter-sector interference observed by sector 110y. Neighbor sector 110y broadcasts the OSI bit on the forward link to terminals in the system.

At terminal 120x, an OSI bit detector 562 receives the OSI bits broadcast by the neighbor sectors and provides the detected OSI bits. A channel estimator 564 receives pilots from the serving and neighbor sectors and estimates the channel gain for each sector. A transmit power delta adjustment unit 566 adjusts the transmit power delta ΔP(n) based on the detected OSI bits, the channel gains, and $\Delta P_{min}$. For example, terminal 120x may adjust ΔP(n) in a deterministic manner based on the OSI bit from the strongest neighbor sector, as follows:

$$\Delta P(n) = \begin{cases} \Delta P(n-1) + \Delta P_{up}(n), & \text{if } OSI \text{ bit} = \text{'0'}, \text{ and} \\ \Delta P(n-1) - \Delta P_{dn}(n), & \text{if } OSI \text{ bit} = \text{'1'}, \end{cases} \quad \text{Eq (8)}$$

where $\Delta P_{up}(n)$ and $\Delta P_{dn}(n)$ may be fixed or variable values. For example, $\Delta P_{up}(n)$ and $\Delta P_{dn}(n)$ may be functions of a channel gain ratio $r_{sns}(n)$ for the strongest neighbor sector and the transmit power delta ΔP(n−1) for the prior update interval n−1. $r_{sns}(n)$ is the ratio of the channel gain for the strongest neighbor sector over the channel gain for the serving sector. If the strongest neighbor sector observes high inter-sector interference and sets its OSI bit to '1', then $\Delta P_{dn}(n)$ may be related to both $r_{sns}(n)$ and ΔP(n−1) so that (1) a larger channel gain for the strongest neighbor sector results in a larger $\Delta P_{dn}(n)$ and (2) a larger value of ΔP(n−1) results in a larger $\Delta P_{dn}(n)$. Conversely, if the strongest neighbor sector observes low inter-sector interference and sets its OSI bit to '0', then $\Delta P_{up}(n)$ may be inversely related to both $r_{sns}(n)$ and ΔP(n−1) so that (1) a larger channel gain for the strongest neighbor sector results in a smaller $\Delta P_{up}(n)$ and (2) a larger value of ΔP(n−1) results in a smaller $\Delta P_{up}(n)$.

ΔP(n) may also be adjusted in a probabilistic manner. For example, if the OSI bit is set to '0', then a probability $Pr_{up}(n)$ for increasing ΔP(n) is determined, and ΔP(n) is increased by $\Delta P_{up}$ based on this probability. Conversely, if the OSI bit is set to '1', then a probability $Pr_{dn}(n)$ for decreasing ΔP(n) is determined, and ΔP(n) is decreased by $\Delta P_{dn}$ based on this probability. $Pr_{up}(n)$ and $Pr_{dn}(n)$ may be determined based on ΔP(n) and $r_{sns}(n)$, and $\Delta P_{up}$ and $\Delta P_{dn}$ may be fixed values.

QoS loop 506 adjusts $\Delta P_{min, i}$ for each QoS class based on the data transmissions received at serving sector 110x for that QoS class. An RX data processor 522 processes the received data transmissions for each QoS class and provides status information. A channel estimator 524 estimates the channel gain for each terminal transmitting to base station 110x. A $\Delta P_{min}$ adjustment unit 528 receives the status information for the data transmissions and the channel gains for all terminals, identifies the disadvantaged terminals in each QoS class, determines the QoS metrics for each QoS class based on the status information for the data transmissions from the disadvantaged terminals, and updates $\Delta P_{min, i}$ for each QoS class based on the QoS metrics and the QoS requirements for that QoS class. Processor 522 and unit 528 may implement process 400 shown in FIG. 4 for each QoS class. Serving sector 110x broadcasts the $\Delta P_{min, i}$ for all QoS classes on the forward link to the terminals within the sector.

At terminal 120x, a signaling processor 560 receives $\Delta P_{min, i}$ for the QoS class applicable to the terminal. Transmit power delta computation unit 566 uses $\Delta P_{min, i}$ for power control, e.g., as shown in equation (2). The constraint in equation (2) effectively limits the received SNRs for the data transmissions for each QoS class i to be within a range of [$SNR_{min, i}$, $SNR_{max, i}$]. This constraint limits the amount of the variability in the received SNRs for these data transmissions and ensures that the amount of intra-sector interference caused by each terminal is within an acceptable level. A disadvantaged terminal located close to a neighbor sector that reports high interference may transmit with a lower transmit power delta so that its received SNR is closer to $SNR_{min, i}$. Conversely, a strong terminal located close to the serving sector may transmit with a higher transmit power delta so that its received SNR is closer to $SNR_{max, i}$.

Q loop 504 adjusts the amount of overlapping to achieve good performance for serving sector 110x. The average number of overlapping terminals (Q) for each time-frequency block is called an overlapping factor. A higher overlapping factor may improve the overall throughput for the serving sector but also increases intra-sector interference for the neighboring sectors. The overlapping factor may be adjusted based on performance metrics, QoS metrics, and so on. In an embodiment, the overlapping factor is adjusted based on the overall throughput for serving sector 110x. RX data processor 522 processes the data transmissions for all QoS classes and provides packet status. An overlapping factor adjustment unit 526 computes the average overall throughput for the sector based on the received and decoded packets. Unit 526 then updates the overlapping factor based on the average overall throughput, as follows:

$$Q(l) = \begin{cases} Q(l-1) \cdot Q_{up}, & \text{if } OTP(l) > OTP(l-1), \\ Q(l-1) \cdot Q_{dn}, & \text{if } OTP(l) < OTP(l-1), \text{ and} \\ Q(l-1), & \text{otherwise,} \end{cases} \quad \text{Eq (9)}$$

where

OTP(l) is an average overall throughput for serving sector 110x in time interval l;

Q(l) is the overlapping factor for serving sector 110x in time interval l;

$Q_{up}$ is the up step size for the overlapping factor, where $Q_{up} > 1$; and $Q_{dn}$ is the down step size for the overlapping factor, where $Q_{dn} < 1$.

The $Q_{up}$ and $Q_{dn}$ step sizes are selected to achieve the desired response for the overlapping factor. Serving sector 110x may broadcast the overlapping factor to the terminals in the sector.

At terminal 120x, signaling processor 560 processes the forward link transmission from serving sector 110x and obtains the overlapping factor. A transmit power computation unit 570 receives the reference power level $P_{ref}(n)$ from unit 552, the transmit power delta $\Delta P(n)$ from unit 566, and the overlapping factor from processor 560. Unit 570 computes the transmit power $P_{dch}(n)$ for the traffic channel based on all of the inputs, e.g., as follows:

$$P_{dch}(n)=P_{ref}(n)+\Delta P(n)-Q_{db}(n), \quad \text{Eq (10)}$$

where $Q_{dB}(n)$ is the overlapping factor that is applicable in update interval n and is given in units of dB. $P_{dch}(n)$ may further be constrained to be equal to or less than a predetermined maximum power level, or $P_{dch}(n) \leq P_{max}$. TX data processor 580 uses the transmit power $P_{dch}(n)$ for data transmission to serving sector 110x.

Power control mechanism 500 effectively uses different mechanisms to separately control inter-sector interference and intra-sector interference. The disadvantaged terminals are the predominant sources of inter-sector interference. QoS loop 506 adjusts $\Delta P_{min,i}$ for each QoS class, which mainly affects the disadvantaged terminals, and hence controls the amount of inter-sector interference caused by these disadvantaged terminals. The overlapping terminals are the major sources of intra-sector interference. Q loop 504 adjusts the overlapping factor and hence controls the amount of intra-sector interference observed by the overlapping terminals.

FIGS. 2 and 5 show two specific power control mechanisms that support QoS implementation. Power control may also be performed in other manners and/or with different parameters than those described above. For example, the QoS parameter may be a power control parameter that is broadcast and applied at the terminals (as described above) or may be a power control parameter that is applied at the serving sector. The QoS parameter may be explicitly adjusted with a dedicated loop (as described above) or may be implicitly adjusted within another loop. In general, a power control mechanism that supports QoS implementation may include any number of loops, and each loop may operate on any power control parameter. The QoS parameter may be $\Delta P_{min,i}$ as described above in FIGS. 4 and 5, $P_{os}$ as shown in equation (3), or some other power control parameter.

Figure 6:
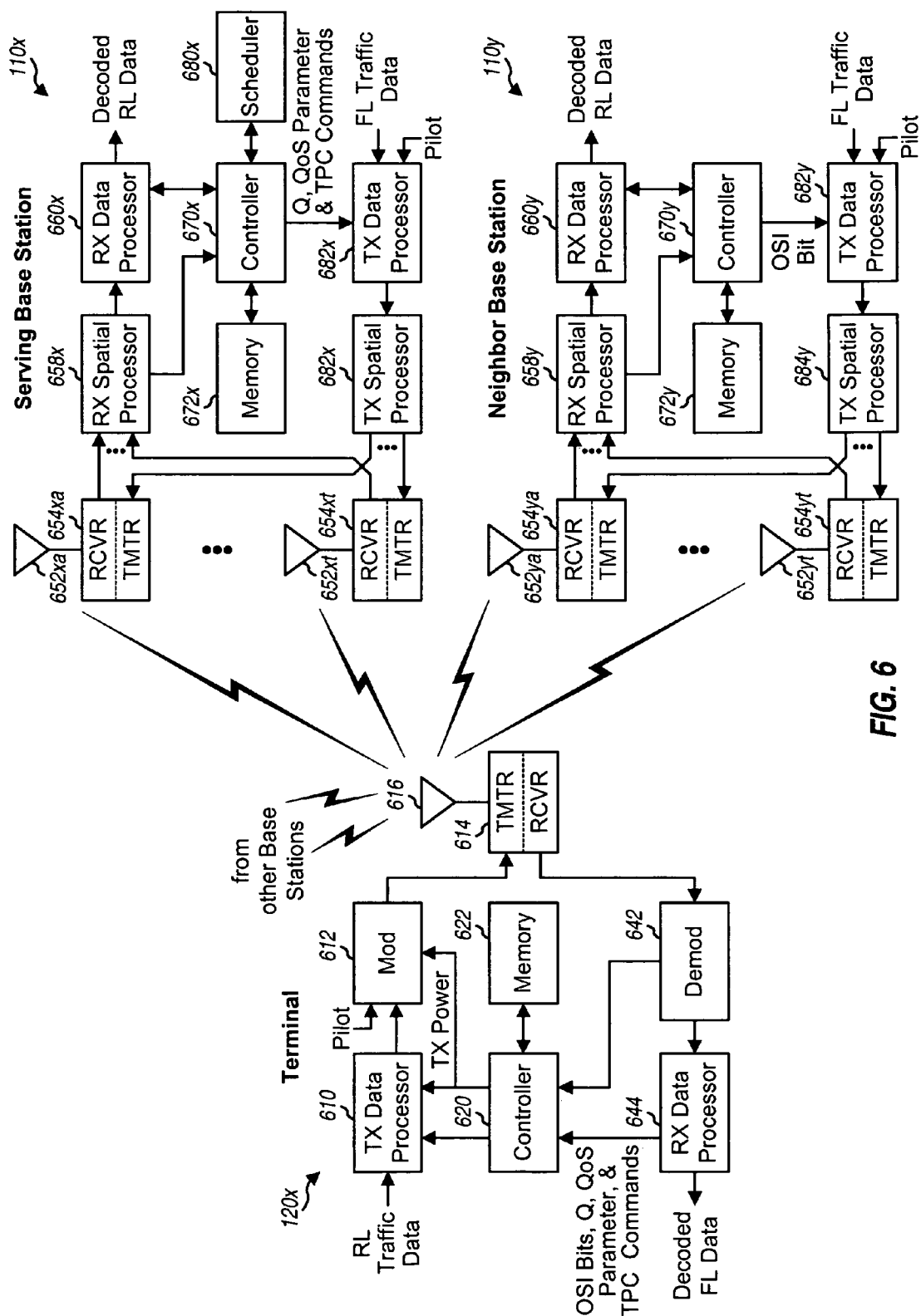
FIG. 6 shows a block diagram of a terminal and two base stations.

FIG. 6 shows a block diagram of an embodiment of terminal 120x, serving base station 110x, and neighbor base station 110y. For clarity, the following description assumes the use of power control mechanism 500 in FIG. 5.

On the reverse link, at terminal 120x, a TX data processor 610 encodes, interleaves, and symbol maps reverse link (RL) traffic data and control data and provides data symbols for the traffic and control data. A modulator (Mod) 612 receives and maps the data symbols and pilot symbols onto the proper subbands and symbol periods, performs OFDM modulation, and provides a sequence of complex-valued chips. A transmitter unit (TMTR) 614 conditions (e.g., converts to analog, amplifies, filters, and frequency upconverts) the sequence of chips and generates a reverse link signal, which is transmitted via an antenna 616.

At serving base station 110x, multiple antennas 652xa through 652xt receive the reverse link signals from terminal 120x and other terminals, and each antenna 652x provides a received signal to a respective receiver unit (RCVR) 654x. Each receiver unit 654x conditions (e.g., filters, amplifies, and frequency downconverts) its received signal, digitizes the conditioned signal, performs OFDM demodulation, and provides received symbols. An RX spatial processor 658 obtains received symbols from all receiver units 654xa through 654xt, performs receiver spatial processing to separate overlapping transmissions, and provides detected symbols, which are estimates of the transmitted data symbols. An RX data processor 660x deinterleaves and decodes the detected symbols, provides decoded data for terminal 120x as well as other terminals being served by base station 110x, and also provides status information (e.g., packet status and delay) used to derive performance and QoS metrics for adjusting the overlapping factor and QoS parameter.

The processing for a forward link transmission may be performed similarly to that described above for the reverse link. The processing for the transmissions on the forward and reverse links is typically specified by the system.

For QoS and power control, at serving base station 110x, RX spatial processor 658x estimates the received SNR for terminal 120x and provides an SNR estimate to controller 670x. Controller 670x generates TPC commands for terminal 120x based on the SNR estimate for the terminal and the target SNR. Controller 670x also receives packet status from RX data processor 660x, derives QoS metrics and/or performance metrics, updates the QoS parameter (e.g., $\Delta P_{min,i}$) for each QoS class based on the QoS metrics for that QoS class, and updates the overlapping factor (e.g., based on a performance metric such as overall throughput). The TPC commands, overlapping factor (Q), and QoS parameter are processed by a TX data processor 682x and a TX spatial processor 684x, conditioned by transmitter units 654xa through 654xt, and transmitted via antennas 652xa through 652xt to terminal 120x. At neighbor base station 110y, an RX spatial processor 658y estimates the inter-sector interference observed by base station 110y and provides an interference estimate to controller 670y. Controller 670y generates the OSI bit for base station 110y based on the interference estimate and the nominal interference threshold. The OSI bit is processed and broadcast to terminals in the system.

At terminal 120x, antenna 616 receives the forward link signals from the serving and neighbor base stations and provides a received signal to a receiver unit 614. The received signal is conditioned and digitized by receiver unit 614 and further processed by a demodulator (Demod) 642 and an RX data processor 644 to obtain the TPC commands sent by serving base station 110x for terminal 120x, the OSI bits sent by the neighbor base stations, the QoS parameter for the QoS class applicable to terminal 120x, and the overlapping factor for base station 110x. A channel estimator within demodulator 642 estimates the channel gain for each base station. Controller 620 detects the received TPC commands and updates the reference power level based on the TPC decisions. Controller 620 also adjusts the transmit power for the traffic channel based on the received OSI bits from the neighbor base stations, the channel gains for the serving and neighbor base stations, the QoS parameter for the applicable QoS class, and the overlapping factor, e.g., as described above. Controller 620 provides the transmit power for the traffic channel assigned to terminal 120x. Processor 610 and/or modulator 612 scales the data symbols based on the transmit power provided by controller 620.

Controllers 620, 670x, and 670y direct the operations of various processing units at terminal 120x and base stations 110x and 110y, respectively. These controllers may also perform various functions for QoS and power control. For example, controller 620 may implement (1) any or all of units 250 through 260 shown in FIG. 2 or (2) any or all of units 550 through 570 shown in FIG. 5. Controller 670 for each base station 110 may implement (1) any or all of units 210 through 224 in FIG. 2 or (2) any or all of units 510 through 542 in FIG. 5. Controller 670 may also implement parts of process 300 in FIG. 3 or process 400 in FIG. 4. Memory units 622, 672x, and 672y store data and program codes for controllers 620, 670x, and 670y, respectively. A scheduler 680x schedules terminals for communication with base station 110x and also assigns traffic channels to the scheduled terminals.

The QoS and power control techniques described herein may be implemented by various means. For example, these techniques may be implemented in hardware, software, or a combination thereof. For a hardware implementation, the processing units used to compute QoS metrics, update QoS parameter, and support power control at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a terminal may be implemented within one or more ASICs, DSPs, processors, controllers, and so on.

For a software implementation, the techniques may be implemented with modules (e.g., procedures, functions, and so on) that perform the functions described herein. The software codes may be stored in a memory unit (e.g., memory unit 622, 672x, or 672y in FIG. 6) and executed by a processor (e.g., controller 620, 670x, or 670y). The memory unit may be implemented within the processor or external to the processor.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for power control for QoS classes in a wireless communication system, comprising:
   a controller operative to identify, for each of at least two terminals given as belonging to a QoS class among a given plurality of Quality of Service (QoS) classes, whether the terminal is a disadvantaged terminal or a not disadvantaged terminal based on an estimated channel gain of the at least two terminals; and
   a processor operative to process data transmissions received from one or both of the at least two terminals given as belonging to said QoS class for at least one of the Quality of Service (QoS) classes and to obtain, for each of at least two of the data transmissions, a status information indicating a received quality of the data transmission,
   wherein the controller is further operative to conditionally update a QoS parameter corresponding to said QoS class, conditional in part on the status information and on whether the received and processed data transmission for which the status information is obtained is from a terminal identified as a disadvantaged terminal, wherein
   if said received and processed data transmission is from a terminal identified as a disadvantaged terminal, to update said QoS parameter for the said QoS class based, at least in part, on the obtained status information and at least one given requirement for said QoS class, and to send the updated QoS parameter to at least two of the terminals given as belonging to the said QoS class, wherein at least one of said at least two is identified as disadvantaged terminal and at least one of said at least two is identified as a not disadvantaged terminal, and
   if said received and processed data transmission is from a terminal not identified as a disadvantaged terminal, to not update said QoS parameter based on the status information obtained for the data transmission.

2. The apparatus of claim 1, wherein the processor is further operative to receive, as at least one of the data transmissions, a data transmission having packets, and to obtain said status information based on a quality of the packets received, and wherein the controller is further operative to derive at least one QoS metric based on the status information of the packets and to include, in updating the first QoS, updating said QoS parameter based on the at least one QoS metric and the at least one requirement for said QoS class.

3. The apparatus of claim 1, wherein the processor is further operative to receive, as at least one of the data transmissions, a data transmission having packets, and to obtain said status information based on a quality of the packets received, and wherein the controller is operative to determine, based on said status information, an error event rate for the data transmission and to include, in updating said QoS parameter, updating said QoS parameter based on the error event rate and an error event limit for said QoS class.

4. The apparatus of claim 3, wherein the processor is further operative to obtain said status information to indicate a packet decoded in error and to indicate a packet being received after a predetermined maximum delay, and wherein the controller is further operative to consider the status information indicating a packet decoded in error as an error event and to consider the status information indicating a packet received after the predetermined maximum delay as an error event.

5. The apparatus of claim 1, further comprising:
   a channel estimator operative to estimate a channel gain for each of the at least two terminals, and wherein the controller is further operative to identify whether each of the at least two terminals is a disadvantaged terminal or a not disadvantage terminal based on the estimated channel gains.

6. The apparatus of claim 1, wherein said QoS class is a first QoS class and said QoS parameter is a first QoS parameter, and wherein the controller is further operative to identify, for each of at least two terminals given as belonging to a second QoS class among a given plurality of QoS classes, whether the terminal is a disadvantaged terminal or a not disadvantaged terminal,
   wherein the processor is further operative to process data transmissions received from one or both of the at least two terminals given as belonging to the second QoS class to obtain, for each of said at least two of the data transmissions, a status information indicating a received quality of said data transmission,
   wherein the controller is further operative to conditionally update, in response to at least one of said status information, a second QoS parameter for the second QoS class among the given plurality of the QoS classes conditional in part on said status information and on whether the received and processed data transmission for which said status information is obtained is from a terminal identified as a disadvantaged terminal, and based at least in part on said status information and at least one given requirement for the second QoS class.

7. The apparatus of claim 6, wherein the first and second QoS classes correspond, respectively, to a first set and a second set of ports.

8. The apparatus of claim 1, wherein said QoS parameter is one selected from the group consisting of: a minimum transmit power, a maximum transmit power, and both minimum and maximum transmit powers for each of the at least two of the terminals to use for a subsequent data transmission.

9. The apparatus of claim 1, wherein the QoS parameter is a target signal-to-noise-and-interference ratio (SNR) for the data transmissions received from one or both of the at least two terminals given as belonging to said QoS class.

10. The apparatus of claim 1, wherein the QoS parameter is a transmission parameter to be met by data transmissions received from one or both of the at least two terminals given as belonging to the said QoS class.

11. The apparatus of claim 1, further comprising a channel estimator to estimate a channel gain for at least the two terminals given as belonging to said QoS class, and wherein the controller is further operative to identify whether each of the two terminals is a disadvantaged terminal based on a comparison of the estimated channel gains against a given gain threshold.

12. The apparatus of claim 11, wherein the controller is further operative to identify, based on the comparison of the estimated channel gains against a given gain threshold, a given quantity of disadvantaged terminals belonging to said QoS class, and to detect error events in the data transmissions received from the given quantity of disadvantaged terminals, and is further configured to use the detected error events meeting a given statistical averaging of error events to update said QoS parameter.

13. The apparatus of claim 1, wherein the controller is further operative to identify a given quantity of disadvantaged terminals belonging to said QoS class, and to detect error events in the data transmissions received from the given quantity of disadvantaged terminals, and is further configured to use the detected error events meeting a given statistical averaging of error events to update said QoS parameter.

14. The apparatus of claim 1, further comprising a channel estimator to estimate a channel gain for each of a plurality of terminals in each of at least two of the QoS classes, and wherein the controller is further operative to identify an order in the estimated channel gains and to identify whether terminals given as belonging to said QoS class are disadvantaged terminals based on a relative position or percentile range within the identified order of estimated channel gains.

15. The apparatus of claim 14, wherein the controller is further operative to determine terminals having an estimated channel gain within a given lower percentile to be disadvantaged terminals.

16. The apparatus of claim 1, wherein the controller is further operative to identify for at least one of the at least two terminals given as belonging to said QoS class a size of an active set of base stations associated with said QoS class, and to identify whether the terminal is a disadvantaged terminal based on the identified size of the active.

17. The apparatus of claim 1, wherein the controller is further operative to identify for at least one of the at least two terminals given as belonging to said QoS class at least one of a port set, a characteristic measurement or a restriction on use of the port set, a pilot strength, or carrier-to-noise (C/N) and is further configured to identify whether the terminal is a disadvantaged terminal based on one of, or on any combination or sub-combination of, the determined least one of a port set, a characteristic measurement or restriction on use of the port set, or the determined pilot strength, or C/N characteristic.

18. A method of implementing power control for Quality of Service (QoS) classes in a wireless communication system, comprising:
identifying, for each of at least two terminals given as belonging to a QoS class among a given plurality of QoS classes, whether the terminal is a disadvantaged terminal or a not disadvantaged terminal based on an estimated channel gain of the at least two terminals;
processing data transmissions received from one or both of the at least two terminals given as belonging to said QoS class to obtain, for each of at least two of the data transmissions, a status information indicating a received quality of the data transmission,
conditionally updating, conditional in part on said status information, a QoS parameter for said QoS class based at least in part on the status information and on whether the received and processed data transmission for which the status information is obtained is from a terminal identified as a disadvantaged terminal, wherein the conditional updating includes:
if said received and processed data transmission is from a terminal identified as a disadvantaged terminal, updating said QoS parameter for said QoS class, based at least in part, on the obtained status information and on at least one given requirement for said QoS class, and
if said received and processed data transmission is from a terminal not identified as a disadvantaged terminal, not updating said QoS parameter based on said status information sending the updated QoS parameter to at least two of the terminals given as belonging to the said QoS class.

19. The method of claim 18, further comprising estimating a channel gain for a plurality of terminals given as belonging to said QoS class, and wherein said identifying whether at least one of the at least two terminals given as belonging to said QoS class is a disadvantaged terminal includes a comparison of the estimated channel gains against a given gain threshold.

20. The method of claim 19, wherein identifying disadvantaged terminals compares the estimated channel gains against the given gain threshold to identify a given quantity of disadvantaged terminals given as belonging to said QoS class, wherein the method further includes detecting error events in the data transmissions received from the given quantity of disadvantaged terminals, and wherein the conditional updating is further based on said detected error events meeting a given statistical averaging of error events.

21. The method of claim 18, further comprising:
identifying for at least one of the at least two terminals given as belonging to said QoS class a size of an active set of base stations associated with said QoS class, and
wherein identifying whether the terminal is a disadvantaged terminal is based on the identified size of the active set.

22. The method of claim 18, further comprising estimating a channel gain for each of a plurality of terminals in each of the QoS classes, and wherein identifying, for each of at least two terminals given as belonging to said QoS class, whether the terminal is a disadvantaged terminal or a not disadvantaged terminal includes identifying an order in the estimated channel gains and identifying terminals to be disadvantaged terminals based on a relative position or percentile range within the identified order of estimated channel gains.

23. The method of claim 18, further comprising:
identifying for each of a plurality of terminals in each of the QoS classes at least one of a port set, a characteristic measurement or a restriction on use of the port set, a pilot strength, or carrier-to-noise (C/N); and
determining whether the terminal is a disadvantaged terminal in that QoS class, based on at least in part on any one of, or on any combination or sub-combination of the identifying of a port set, a characteristic measurement or restriction on use of the port set, or the determined pilot strength, or C/N characteristic.

24. The method of claim 18, further comprising sending the updated QoS parameter to at least two of the terminals given as belonging to said QoS class.

25. The method of claim 18, wherein the least two of the terminals to which the updated QoS parameter is sent include a disadvantaged terminal belonging said QoS class and a not disadvantaged terminal belong to said QoS class, and
wherein the method further comprises using the updated QoS parameter, by said disadvantaged terminal and by said not disadvantaged terminal for respective power control of respective subsequent data transmissions associated with said QoS.

26. An apparatus for power control for QoS classes in a wireless communication system, comprising:
a processor operative to process received data transmissions for each of at least two of a plurality of Quality of Service (QoS) classes, the received data transmissions for each of at least two of QoS classes being received at a base station from at least two terminals among a plurality of terminals associated with the QoS class, to obtain a respective status information for each of at least two received data transmissions for each of the at least two QoS classes, wherein the obtained status information indicates a received quality of the data transmission; and
a controller operative to update a QoS metric for each of the at least two QoS classes, based on the status information obtained for the received data transmissions for the QoS class, wherein the QoS metric indicates any among, or any combination of, a transmission delay, a packet error rate, or a packet jitter of data transmissions for the QoS class received from one or more of the at least two terminals,
wherein the controller is further operative to update a corresponding QoS parameter for each of the at least two QoS classes based on a comparison of the updated QoS metric for the QoS class to at least one requirement for the QoS class, wherein the QoS parameter is a power control parameter for use by at least two terminals associated with the QoS class and to send the updated QoS parameter to each of the at least two terminals associated with the QoS.

27. The apparatus of claim 26, wherein the plurality of QoS classes support a plurality of services, and wherein the at least one requirement for each QoS class is determined based on at least one performance requirement for a service mapped to the QoS class.

28. The apparatus of claim 26, wherein the processor is further operative to derive a signal-to-noise-and-interference ratio (SNR) estimate for each of at least two of the plurality of terminals, and wherein the controller is further operative to generate a transmit power control (TPC) command for each terminal based on the SNR estimate for the terminal.

29. The apparatus of claim 26, further comprising:
an interference estimator operative to estimate inter-sector interference observed by the base station, and wherein the controller is further operative to generate an indication of the inter-sector interference observed by the base station.

30. The apparatus of claim 29, wherein the further controller is operative to generate an other-sector interference (OSI) bit indicative of the inter-sector interference observed by the base station relative to an interference threshold.

31. The apparatus of claim 26, wherein the controller is further operative to update an overlapping factor based on the at least one QoS metric, the overlapping factor being indicative of an average number of overlapping transmissions for the base station.

32. An integrated circuit comprising a storage unit having software code stored thereon, the software code being executable by a processor and when executed by the processor cause the processor to:
identify, for each of at least two terminals given as belonging to a Quality of Service (QoS) class among a given plurality of QoS classes, whether the terminal is a disadvantaged terminal or a not disadvantaged terminal based on an estimated channel gain of the at least two terminals;
process data transmissions received from one or both of the at least two terminals given as belonging to said QoS class to obtain, for each of at least two of the data transmissions, a status information indicating a received quality of the data transmission; and
conditionally update, conditional in part on said status information, a QoS parameter for said QoS class based at least in part on the status information and on whether the received and processed data transmission for which the status information is obtained is from a terminal identified as a disadvantaged terminal, wherein the conditional updating includes:
if said received and processed data transmission is from a terminal identified as a disadvantaged terminal, update said QoS parameter for said QoS class, based at least in part, on the obtained status information and on at least one given requirement for said QoS class, and
if said received and processed data transmission is from a terminal not identified as a disadvantaged terminal, not update said QoS parameter based on said status information.

33. The integrated circuit of claim 32, wherein the storage unit has further software code stored thereon, the further software code being executable by a processor and when executed by the processor causes the processor to: send the updated QoS parameter to at least two of the terminals given as belonging to the said QoS class.

34. A processor-readable storage, with software code instructions stored thereon, comprising software code that when executed by a processor causes the processor to:
identify, for each of at least two terminals given as belonging to a Quality of Service (QoS) class among a given plurality of QoS classes, whether the terminal is a disadvantaged terminal or a not disadvantaged terminal based on an estimated channel gain of the at least two terminals;
process data transmissions received from one or both of the at least two terminals given as belonging to said QoS class to obtain, for each of at least two of the data transmissions, a status information indicating a received quality of the data transmission,
conditionally update, conditional in part on said status information, a QoS parameter for said QoS class based at least in part on the status information and on whether the received and processed data transmission for which the status information is obtained is from a terminal identified as a disadvantaged terminal, wherein the conditional updating includes:
if said received and processed data transmission is from a terminal identified as a disadvantaged terminal, update said QoS parameter for said QoS class, based at least in part, on the obtained status information and on at least one given requirement for said QoS class, and if said received and processed data transmission is from a terminal not identified as a disadvantaged terminal, not update said QoS parameter based on said status information.

35. The processor-readable storage of claim 34, further comprising software code that when executed by a processor causes the processor to: send the updated QoS parameter to at least two of the terminals given as belonging to the said QoS class.

* * * * *